Dec. 19, 1933.  E. W. PAGE  1,939,829

METHOD AND MEANS OF RADIOGRAPHY

Filed May 13, 1929

INVENTOR
EVERETT W. PAGE
BY
ATTORNEY

Patented Dec. 19, 1933

1,939,829

UNITED STATES PATENT OFFICE 1,939,829

METHOD AND MEANS OF RADIOGRAPHY

Everett W. Page, River Forest, Ill., assignor to General Electric X-Ray Corporation, Chicago, Ill., a corporation of New York Application May 13, 1929. Serial No. 362,549.

2 Claims. (Cl. 250—34)

The present invention relates to X-ray photography or radiography and has to do with means for reducing the effects of secondary radiation upon light sensitive plates, films, or other bases.

In the radiography of relatively dense materials where either relatively high voltages or relatively long exposures, or both, are essential, the blocking from the film of diffused and secondary radiation is an item of the greatest importance. Although not generally so stated, this problem of blocking off secondary radiation has baffled a great number of investigators and it has had as much to do with the lack of progress in the radiography of commercial products, such as castings, ingots, parts, assemblies and the like, as all other difficulties relative to X-ray photography combined.

The radiography of a flat object is relatively simple. It is when the object is irregular in configuration and of varying thickness that the difficulty has heretofore been insurmountable. Without using a method such as is described herein, good radiographs can not be had.

Even in the conventional radiography of flat objects, the secondary radiation from the edge of the object will diffuse itself inside the outline of the object and either blur or entirely eliminate this outline. If the object being photographed is of such shape so that a portion of it is flat and a portion of it is spaced at a distance from the film or casette in which the film is contained, this diffusion will assume greater proportions, and depending upon the exact contour and magnitude of the various surfaces as well as on the length of exposure, it will more or less entirely wipe out the radiograph of the object itself. Highly irregular objects, such as those composed of cylindrical sections, are practically impossible to radiograph under the methods employed before the present invention.

The principal object of this invention is to provide means for the absorption of such unwanted radiation, secondary and tertiary, and to block from the film all but the primary radiation passing through the object. In this way, the resulting radiograph is clear in outline and clean in contrasts and is highly effective from a standpoint of using it for locating defects in the object radiographed.

In the preferred embodiment of the invention, it is preferable to use a material relatively opaque to X-rays, as for example, barium sulphate. This material, a definite chemical compound, may be used in the form of a paste or as a dry powder, and it may be packed around the object to be radiographed.

Figure 1:
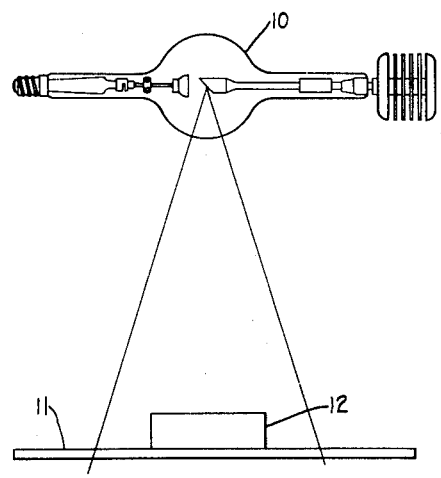

In the drawing which illustrates the preferred embodiment of the invention, Figure 1 represents an arrangement used in radiographing a flat object under the present conventional scheme. In this particular figure, the ordinal 10 represents a source of X-rays, such as a hot cathode tube, 11 indicates a plate or film and the object to be radiographed is designated 12. If the material of which the object 12 is composed is sufficiently dense and opaque to X-light to make a long exposure or a very high voltage necessary, the radiograph resulting from this arrangement shown can not be clear. The outlines of object 12 on the film 11 will not be sharp and distinct.

Due to secondary and tertiary radiation from the edges of object 12 passing between object 12 and the film 11, there will be a blurring and partial elimination of the outline of the object 12.

Figure 2:
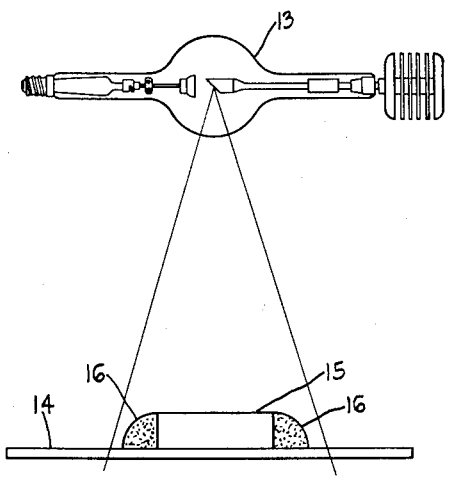

Figure 2 in the drawing shows an arrangement whereby a similar object 15 is arranged to be radiographed in accordance with the present invention. In said Figure 2, an X-ray tube 13 projects X-light upon a film 14, such X-light penetrating an object 15 about which material 16 opaque to X-rays is packed closely to absorb diffused radiation from the edges thereof.

A radiograph taken in this manner will show a clean and sharp outline of the object without blurring and without veiling the details thereof by the light effects produced by secondary or diffused radiation.

Figure 3:
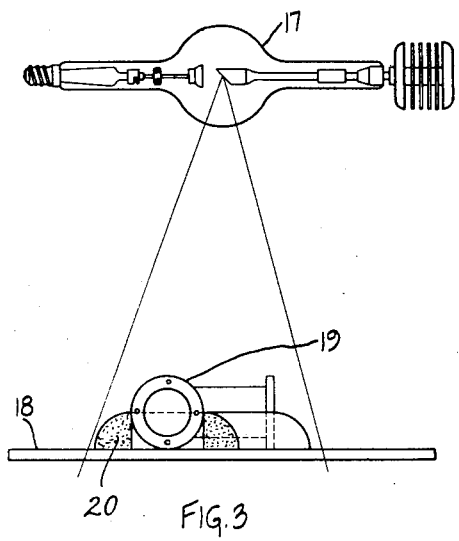

When an object is cylindrical in character, an arrangement like that shown in Figure 3 is employed. In said figure, an X-ray tube 17 affects a photographic plate 18 by projecting X-light through an object 19 which in the present instance is a pipe fitting. In this arrangement, the material 20 is so packed that it forms a wall tangent to the point of the greatest diameter of the object 19 and fills in behind this wall with this X-ray opaque material, thus serving the same purposes as the arrangement illustrated in Figure 2.

While it is entirely possible to use a dry powder or for that matter, a liquid under certain conditions, for this work, it is desirable to use a putty-like mass which can be readily moulded and retain its moulded shape a sufficient length of time to permit a photographic exposure to be made.

The material then not only serves as a means for absorbing the undesired secondary radiation, but also acts as a support for the object being radiographed.

In the preferred embodiment of the invention, barium sulphate is mixed up with any desired oily material, such as linseed oil, sperm oil, or the like. The single function of the oil is a means for holding the particles of the powder in a coherent pliable mass. If the odor of the oil selected is found objectionable, it may be flavored as for instance, with pine oil.

Where opacities greater than that which can be secured by the use of barium sulphate are required, any lead salt may be used. It is better to use barium sulphate whenever possible on account of its non-poisonous qualities, and it has been found that additional opacity may be added to the barium sulphate by the inclusion in the pasty mass thereof of a sufficient quantity of a material of higher atomic weight than barium, such as a quantity of powdered tungsten.

While herein is described the invention in its preferred embodiment, it is not intended that it shall be limited to the particular method and means disclosed. Rather, it is intended to claim all methods of radiography wherein means are provided for closely positioning absorptive material to an object to be radiographed whereby diffused radiation from this object is blocked from the film and clear outlines of the object on the film are obtained.

I claim:

1. A method of producing a sharp outline radiograph of an object which includes the steps of placing a ray absorbing material around and in contact with the sides of the object to be radiographed, positioning the object and ray absorbing material adjacent light sensitive means, and subjecting the object and means to X-radiation.

2. A method of producing a sharp outline radiograph of an object which includes the steps of placing a ray absorbing material around and in contact with the sides of the object to be radiographed with the lowermost plane of the ray absorbing material coincident with the lowermost plane of said object, positioning the object and ray absorbing material adjacent light sensitive means, and subjecting the object and means to X-radiation.

EVERETT W. PAGE.